United States Patent Office 3,233,104
Patented Feb. 1, 1966

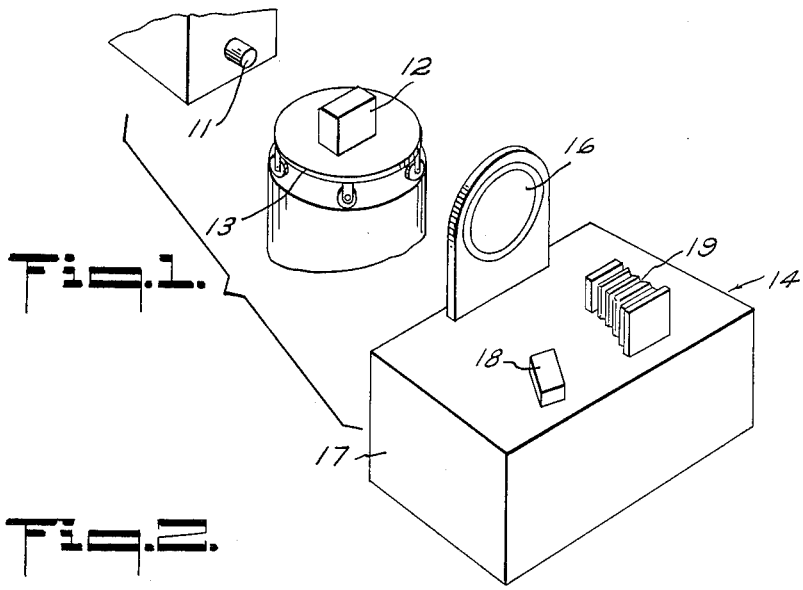
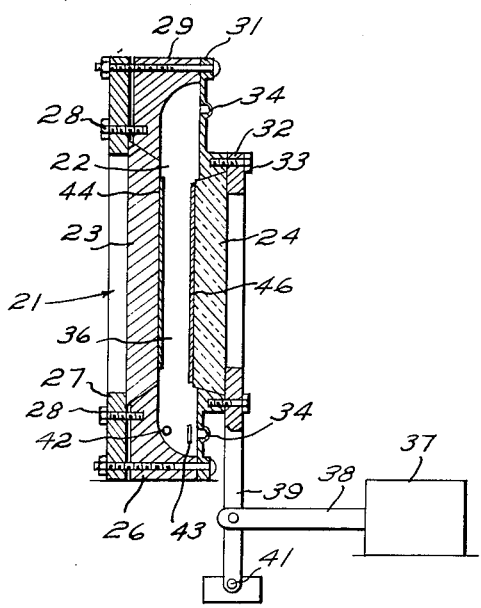
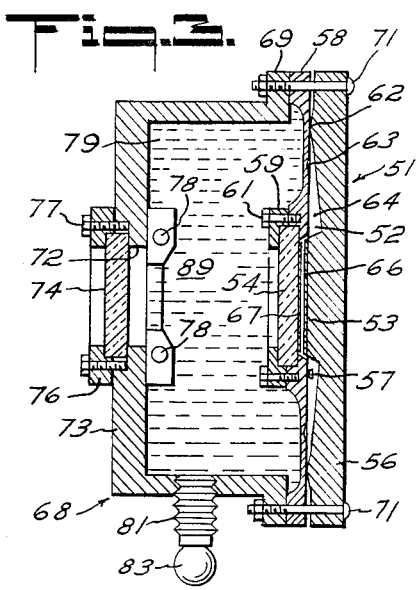
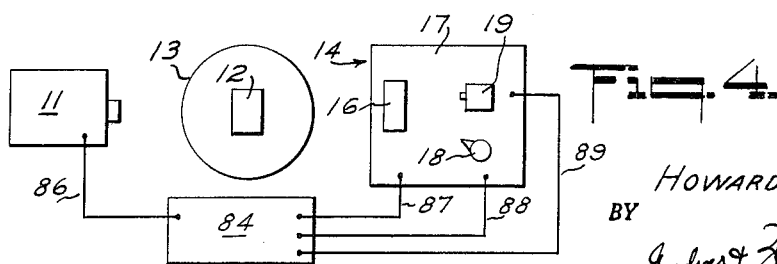
INVENTOR.
HOWARD HEFFAN
BY
*Gardner & Zimmerman*
ATTORNEYS

3,233,104
HIGH ENERGY RADIOGRAPHIC APPARATUS
USING A BUBBLE CHAMBER DETECTOR
Howard Heffan, 1776 Kaywood Drive, Oakland, Calif.
Filed Oct. 15, 1962, Ser. No. 230,522
7 Claims. (Cl. 250—83)

My invention relates, in general, to radiographic apparatus utilizing penetrating radiation and, more particularly, to radiographic apparatus and methods utilizing high energy X-ray and gamma rays or neutrons as the penetrating radiation and including an especially constructed bubble chamber as the display or detection means.

Usual radiographic arrangements generally include a source of X-ray or gamma radiation in which the radiation is directed through the subject to be examined and the emergent radiation is displayed on a fluorescent screen or is detected by means of suitable photographic film yielding a roentgenograph or X-ray photograph. Conventional image forming systems have been limited to use with radiation energies of below about 1 m.e.v. due to the inherent limitations of image display components, e.g., fluoroscopic screens, etc., and no satisfactory means has been available for utilizing neutrons in the manner indicated. There is now developing an increasingly urgent need for radiographic and particularly fluoroscopic equipment which may utilize energy radiation sources productive of radiation of higher energy than those usually employed heretofore. In medical practice, X-ray and gamma ray sources of above 2–3 m.e.v. energy are also coming into some usage for therapy purposes rather than for image forming purposes. The maximum practical limit in thickness of, e.g., solid rocket propellants which can be inspected using the higher voltage X-ray machines, i.e., up to 2 m.e.v., or Cobalt-60 gamma rays, i.e., about 1.3 m.e.v., is about 30 inches. To inspect propellant bodies, metallic structural forms and other subjects in the thicknesses or having the attenuation power now being developed requires X-ray and gamma ray energies of the order of 10–25 m.e.v. or higher. Radiation sources such as linear accelerators, betatrons, synchrotrons and the like are available for the purpose and some large sections have been examined utilizing X-ray film as the detector.

In accordance with my invention there is utilized as the detector or display means, in a high energy radiographic system, an especially constructed bubble chamber capable of providing an image corresponding to the transmission characteristics of the subject. Such bubble chamber is constructed to provide a thin thickness dimension normal to the incident radiation beam wherefor the density of bubble paths varies in correspondence to the intensity of the incident radiation in such manner that illumination provides an accurate image. Such an image may be viewed directly but is also suitable for remote viewing as by closed circuit television as well as for photographic recording. Adaptations are provided for intensifying the image and to more effectively employ incident radiation for image production. As a prime feature of importance an adaptation is provided whereby neutron beams may effectively be utilized to produce an image so that the superior penetrative properties may yield a fluoroscopic image of reasonable resolution. While of especial usefulness for high energy radiography, the apparatus may also be used with lower energies.

Accordingly it is an object of my invention to provide radiographic apparatus including a novel image display or fluoroscopic radiation detector means suitable for use with high energy X-ray and gamma radiation or neutrons.

Another object of my invention is to provide a high energy radiographic system including a bubble chamber and methods for operating same for use as a detector and display means for high energy X-ray and gamma radiation as well as for neutron beams.

A further object of my invention is to provide a bubble chamber having a thin thickness dimension traversed by incident radiation and provided with illumination in such a manner as to yield a visible image corresponding to the variable intensity of X-ray, gamma ray and neutron beams incident thereon.

A still further object of my invention is to provide a thin dimension bubble chamber image display mechanism for use with high energy X-ray and gamma radiation or neutron beams including means for intensifying the image produced therein.

The invention possesses other objects and features of advantage, some of which, with the foregoing will be set forth in the following description of the preferred form of the invention which is illustrated in the drawing accompanying and forming part of the specification. It is to be understood, however, that variations in the showing made by the said drawing may be adopted within the scope of the invention as set forth in the claims.

With reference to said drawing:

FIGURE 1 is a schematic representation of a high energy radiographic installation including an image display bubble chamber in accordance with the invention.

FIGURE 2 is a cross sectional view of a bubble chamber embodiment shown schematically in FIGURE 1.

FIGURE 3 is a cross sectional view of a second embodiment of the bubble chamber shown in FIGURE 1.

FIGURE 4 is a plan schematic view of the apparatus shown in FIGURE 1 including synchronizing circuitry.

In the recent past bubble chambers have been developed as a highly satisfactory means for studying atomic and sub-atomic particles, the interaction of ionizing radiation with matter and for other purposes in high energy physics. These devices generally employ a relatively large cubical volume of a selected fluid, quite often an exotic material such as hydrogen, since it is usually desired to observe and plot all of the paths in a three dimensional fashion of a selected nuclear interaction, or the like. However, such a large volume bubble chamber would be unsuitable for the purposes intended herein for reasons apparent hereinafter. Bubble chambers are basically a device in which a fluid is present in a superheated or similar state at the time ionizing radiation is applied. Ionizing radiation traversing such a fluid produces a trail of charged particles and other nuclei about which the vapor of the superheated fluid may coalesce to form a trail of minute bubbles corresponding to the radiation path. With the passage of time the initial minute bubbles enlarge wherefor, with appropriate illumination, the path becomes visible in three dimensions and can be photographed.

In practicing the present invention an apparatus arrangement of the typical type illustrated in FIGURE 1 of the drawing may be used. As shown therein a high energy X-ray or gamma ray source 11 such as a linear accelerator, betatron, Van der Graaf accelerator or the like may be utilized to supply the high energy radiation, e.g., 3 m.e.v. or above. The source 11 may also be a neutron source such as Ra–Be, pulsed neutron source, Cockraft-Walton generator using the T–D reaction, or the like. The object or subject 12 to be examined may be disposed on a turntable 13 or the like for appropriate positioning for application of the radiation from source 11. A unitary assembly 14 may be conveniently provided with a radiographic bubble chamber 16 constructed in accordance with the invention being mounted and supported on a cabinet housing 17 wherein auxiliary components of the apparatus may be assembled. The bubble chamber 16 is arranged to intercept radiation from source 11 following passage through the subject 12 in such a manner that ionization paths therein are substantially normal to the viewing face as noted more fully hereinafter. Illumination to provide the image may be supplied by a light source 18 mounted obliquely while a camera, controlled circuit televsion camera, 19 or other optical data recording device is mounted to directly face the bubble chamber 16.

Briefly, a radiographic bubble chamber constructed in accordance with the invention will include, as an essential element, means defining a chamber of a planar volumetric configuration with a uniform but thin thickness dimension wherein a bubble forming medium is disposed. Thickness of the order of $\frac{1}{32}$ to $\frac{1}{4}$ inch are generally preferred. However, the factor which determines the maximum allowable thickness is that at which there occurs an excessive divergence of the paths from a normal path directly through the medium so as to unduly reduce the fidelity and/or contrast of the image. It may be noted that a path normal to the planar volume and viewed in the normal direction will project and appear as a point or dot which divergent paths present a more diffuse pattern. For operation of the bubble chamber means are provided for pressurizing the medium, controlling medium temperature and for releasing pressure on the medium at a time appropriate to provide the image.

It will be understood that the density of radiation produced trails or paths is proportional to the dosage or intensity of the radiation traversing the bubble forming medium. Accordingly, when a uniform intensity radiation field or beam is supplied by the radiation source and is applied through a medium constant in thickness and which is uniform in composition with no resolvable discontinuities, a uniform pattern of projected tracks, i.e., dots or points, appears as the image on the bubble chamber viewing screen. However, if discontinuities in structure, absorption efficacy or inhomogeneous compositions, etc., are present differential absorption or diffraction of the radiation occurs and the bubble chamber develops an image corresponding thereto. In areas where the effective radiation opacity of the subject is low more radiation is transmitted and a more opaque or highlighted image area is formed as more light reflective ionization trails are formed in such an area. Areas in which lower intensity radiation is transmitted due to a higher radiation opacity appear relatively dark since fewer ionization trails are present to reflect and disperse the viewing light.

More particularly, the radiographic bubble chamber embodiment 21 shown in FIGURE 2 of the drawings is provided with a thin planar vertical chamber volume 22 of the character described above of uniform thickness defined between a forward window member 23 constructed of a radiation transparent material such as light metal, e.g., aluminum, plastic or glass and a rearward transparent window viewing member or screen 24. Window member 23 is disposed in a sealed relation within a circular or rectangular frame 26 and is retained therein as by means of a retainer ring 27 secured by mounting screws 28. The rearward surface of frame 26 is provided with a raised rim 29 with the height thereof corresponding to the thickness of chamber volume 22, to which a frame member 31 in which rear window 24 is sealed and retained by means of a retainer ring 32 secured by screws 33. The frame member 31 is provided with a flexural joint 34 whereby window 24 may be moved to vary the thickness of cavity volume 22 while preserving a uniform parallel spacing. A bubble forming medium 36 is disposed in chamber volume 22 leaving little or no void whereby such medium may be placed under hydrostatic pressure of predetermined magnitude by application of a compressive force to window member 24. Conveniently, such pressure may be applied as by means of one or more air cylinders 37 (only one shown) arranged with the piston rod 38 coupled to a mid-length portion of an outwardly extending tab portion 39 of retainer ring 32. More effective leverage is obtained by providing the outward end of tab 39 as a pivot 41. It will be apparent that the air cylinder 37 may now be provided with appropriate air pressure controlled by means of valves (not shown) to synchronize the operation of the chamber 21 with cameras and radiation sources. Thermocouple elements such as that shown at 42 may be disposed within the chamber to indicate temperature and/or control temperature utilizing, for example, an immersion heater 43 disposed in the lower portion of chamber volume 22. Pressure sensing and indicating means (not shown) may also be provided to facilitate operation.

Due to the low efficiency with which high energy gamma and/or X-rays would ordinarily interact with such a thin section of medium 36 a thin foil 44 of a heavy metal such as gold is attached to the inner surface of window 23 as a matter of preference. Accordingly, incident X-ray gamma radiation interacts therewith to provide conversion electrons which are more effective in producing ionization tracks in medium 36. In the event that a fast neutron radiation source is employed a similar heavy metal foil may be used as a converter; however, with neutrons of various energies foils containing boron isotopes or the like reactive with intermediate and fast neutrons may be used, providing a very high degree of enhanced ionization in medium 36. Alternatively, medium 36 might comprise lithium, boron and other light neutron absorption cross-section materials in solution to provide enhanced bubble track formation. An aluminized coating or film 46 of partial optical opacity may be applied to the inner surface of window 24 to minimize internal reflections and therefore to serve as an image intensifier.

In the second embodiment 51 shown in FIGURE 3 of the drawing a chamber volume 52 generally corresponding to volume 22 is provided between a forward window 53 of radiation transparent material and a transparent rearward window 54. Window 53 is in the form of a center section of a plate 56 having an annular depression formed about window section 53. Rearward viewing screen window 54 is secured within a frame member 58 by means of a retainer ring 59 affixed with screws 61 while frame 58 bears upon a raised peripheral face portion 62 of plate 56. Frame member 58 is made thin in an area 63 inwardly of the face portion 62 to provide a flexural hinge whereby window 54 may be caused to move with reference to window 53 to vary the spacing therebetween in order to vary the hydrostatic pressure on a bubble forming medium 64 similar to medium 36 described above. A coating or film 66 similar to foil 44 and an aluminized film 67 similar to film 46 may be used for purposes similar to those described above. Pressure and temperature indicating means as well as temperature control means (not shown) may also be employed as with embodiment 21.

While the foregoing embodiments 21 and 51 are somewhat similar with respect to the bubble medium chamber, different illumination and pressure applying means are employed. In embodiment 51 a ball casing 68 is mounted with a flanged wall portion 69 bearing upon peripheral portions of frame 58 and to raised face 62 of plate 56 as by means of screws 71. An opening 72 is provided in end wall 73 of casing 68 in which is mounted a transparent window 74 secured as by means of a retainer ring 76 secured by screws 77. Light sources 78 may be disposed about the inner edges of opening 72 so as to direct light obliquely through window 54 in order to illuminate ionization tracks and provide a viewable or recordable image. A pressure transmitting medium 79 such as a clear organic fluid, water, silicone oil or the like is disposed in the chamber 89 defined by bell casing 68 to serve for application of pressure to window 54. Gas pressure might likewise be employed. A pressurizing means such as the bellows cylinder 81 communicating with chamber and an appropriate motive power means 83 actuating such a cylinder 81 may be utilized for applying proper operating pressure to medium 79. Motive power means 83 may be a solenoid controlled air cylinder, a piezoelectric device, a magnetic solenoid device or other easily actuated and controlled pressure exerting power means. Pressure and temperature sensing means (not shown) may be employed in association with chamber volume 81 or other circuit components containing medium 79. Likewise, thermostatic temperature control elements (not shown) may be disposed in chamber volume 81 or arranged in an exterior circuit (not shown) adapted to circulate medium 79 within chamber 89.

The operation of the various components can be synchronized and controlled as shown in FIGURE 4 of the drawing by utilizing a sequence timing means 84. The sequence timer, either mechanical or electronic, is coupled as by means of line 86 to actuate radiation source 11 and to simultaneously or with a slight time delay to release the pressure on the bubble forming media 36 or 64 to provide superheated conditions therein whereby the ionization trails of vapor bubbles are formed by energization of line 87. At a time selected to obtain optimum qualities, e.g., maximum or optimum bubble size, means 84 is arranged to energize light source means 18 and data observing means 19 as by energizing lines 88 and 89 respectively.

In theory the bubble forming medium may be any clear fluid devoid of nucleating solids which can be heated under pressure above its critical point and then remain in a superheated fluid state upon release or decrease in pressure to below the critical point for the necessary period of time. Single component fluids, fluids with a gas dissolved therein and multi-component fluids may accordingly be employed. A Freon refrigerant such as Freon 13–B1 having a composition which is indicated by the formula $CF_3Br$ may be operated at a temperature of about 30° C. with an applied pressure of about 310 p.s.i. and with the pressure reduced to below about 200 p.s.i. to produce the bubble trails. Another satisfactory bubble forming medium is propane, $C_3H_8$, at an applied pressure of about 400 p.s.i. and a temperature of 150° C., and an operating pressure of about 200 p.s.i. The bubble chamber is sensitive for time periods of the order of 20 milliseconds wherefor single or several radiation pulses may be recorded from pulsed radiation sources. Likewise the pressure may be reapplied in the bubble chamber and the operation repeated to improve the contrast and intensity recorded on film or observed by television data recorders.

What is claimed is:

1. In apparatus for producing and recording images utilizing high energy radiation, a bubble chamber image display apparatus comprising a first planar window element transparent to said radiation, a second planar optically transparent window element disposed in a uniform closely spaced relation to said first window element, flexural joint means supporting said first and second window elements, said elements thereby defining a chamber having a thin thickness dimension therebetween, a bubble forming medium disposed in said chamber, and means operable to apply pressure to said medium and being releasable to provide supercooled conditions therein.

2. Apparatus as defined in claim 1 wherein a foil comprising material capable of interacting with said radiation to provide products more efficient in producing nucleation in said medium is disposed on the inner surface of said first window element in said chamber.

3. Apparatus as defined in claim 1 wherein thermostatic temperature control means is associated with said chamber to regulate the temperature of said medium.

4. Apparatus as defined in claim 1 wherein said means operable to apply pressure to said medium comprises motive power means arranged to apply a compressive force between said window elements.

5. Apparatus as defined in claim 1 wherein said means operable to apply pressure to said medium comprises a bell casing covering said second window element with said flexural joint means being disposed between an optically transparent portion and the peripheral wall of said casing, pressure transmitting fluid means disposed in said bell casing, and means for applying pressure releasably to said fluid means.

6. Radiographic apparatus including in combination, a radiation source adapted to provide a beam of high energy radiation, a bubble chamber having a pair of parallel closely spaced walls disposed transversely relative to said beam with one of said walls being closest to said source and having a bubble forming fluid disposed between said walls, said one wall being transparent to said radiation beam, said other wall being optically transparent, optical data observing means disposed in confronting relation to the external side of said other wall for observing images formed in said chamber, means for illuminating bubbles formed in said fluid by incident radiation thereon, and means for selectively moving said two walls from and toward one another to vary the pressure of said fluid.

7. Radiographic apparatus including in combination, a radiation source adapted to provide a beam of high energy radiation, a bubble chamber having a pair of parallel closely spaced walls disposed transversely relative to said beam with one of said walls being closest to said source and having a bubble forming fluid disposed between said walls, said one wall being transparent to said radiation beam, said other wall being optically transparent, optical data observing means disposed in confronting relation to the external side of said other wall for observing images formed in said chamber, means for illuminating bubbles formed in said fluid by incident radiation thereon, a foil comprising a material capable of interacting with said radiation to provide products more efficient in producing nucleation in said fluid is disposed on the inner surface of said one wall in said chamber, and a foil comprising a material capable of reducing internal light reflections in said fluid is disposed on the inner surface of said other wall in said chamber.

References Cited by the Examiner
UNITED STATES PATENTS

| | | | |
|---|---|---|---|
| 2,899,557 | 8/1959 | Wilson | 250—83 X |
| 2,900,518 | 8/1959 | Good | 250—83 |
| 3,045,528 | 7/1962 | Norgren | 250—83 X |

RALPH G. NILSON, *Primary Examiner.*

ARCHIE R. BORCHELT, *Examiner.*